Feb. 3, 1948.　　　　　E. E. ZIDECK　　　　　2,435,378
CORN POPPING AND DISPENSING APPARATUS
Filed Oct. 31, 1944　　　10 Sheets-Sheet 1
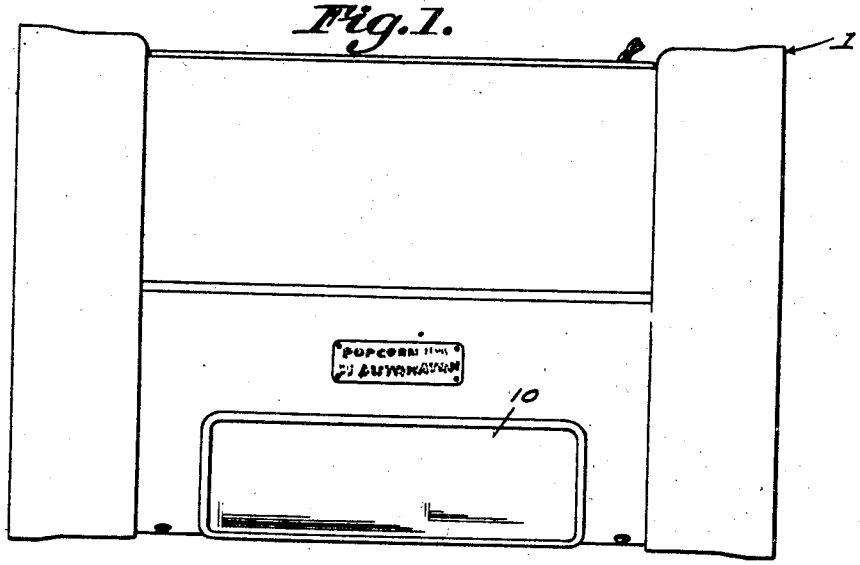
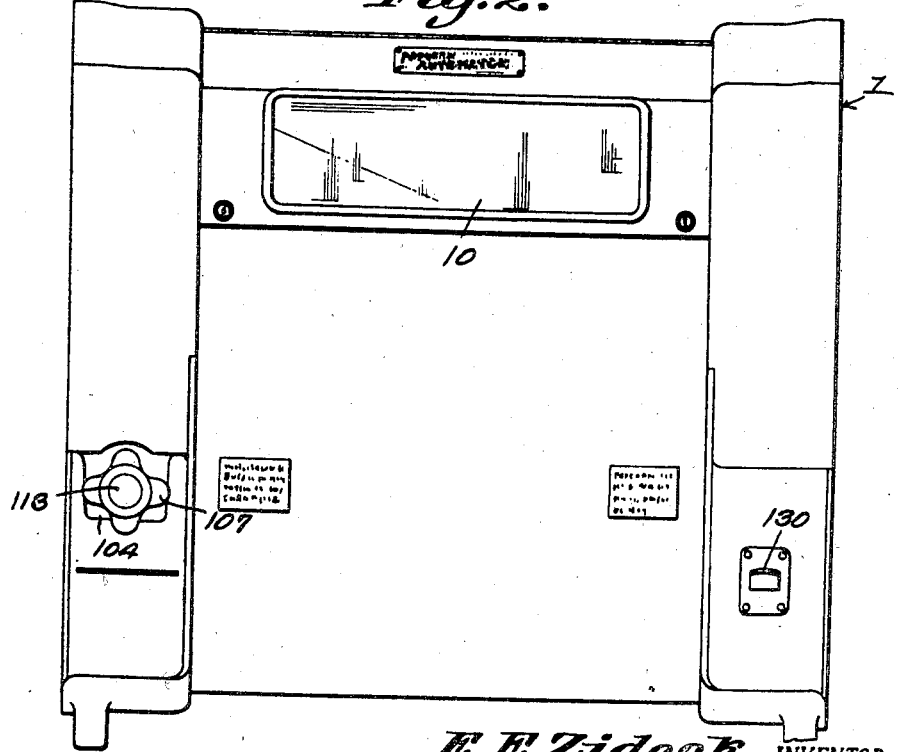
E. E. Zideck INVENTOR.
BY *Knowles*
ATTORNEYS.

Feb. 3, 1948.　　　　E. E. ZIDECK　　　　2,435,378
CORN POPPING AND DISPENSING APPARATUS
Filed Oct. 31, 1944　　　10 Sheets-Sheet 2
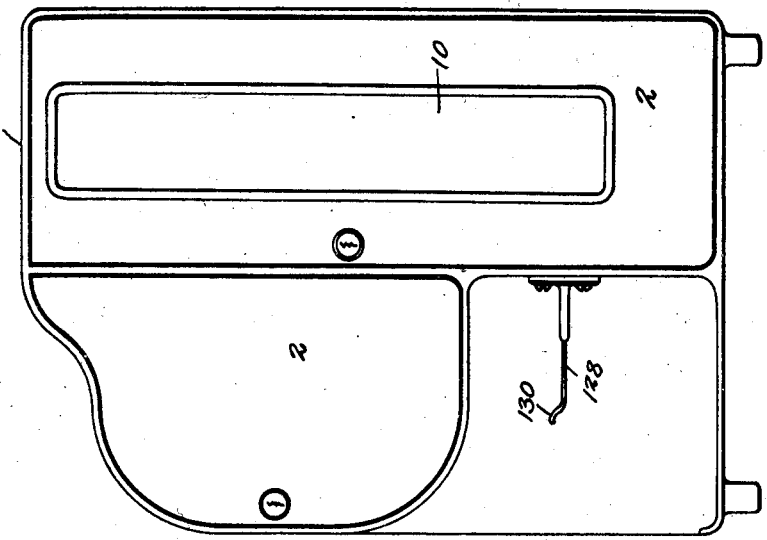
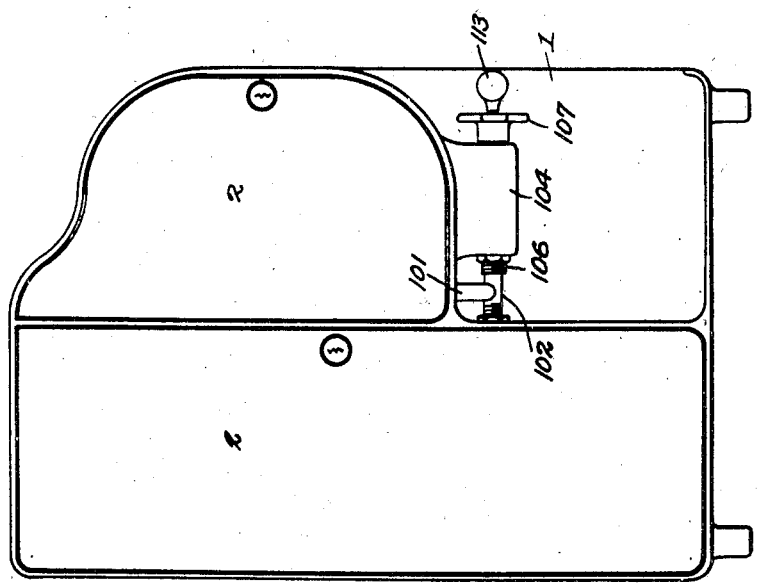
E. E. Zideck
INVENTOR.
BY
ATTORNEYS.

Feb. 3, 1948.  E. E. ZIDECK  2,435,378
CORN POPPING AND DISPENSING APPARATUS
Filed Oct. 31, 1944  10 Sheets-Sheet 3

E. E. Zideck
INVENTOR.

BY
ATTORNEYS.

Feb. 3, 1948.    E. E. ZIDECK    2,435,378
CORN POPPING AND DISPENSING APPARATUS
Filed Oct. 31, 1944    10 Sheets-Sheet 5
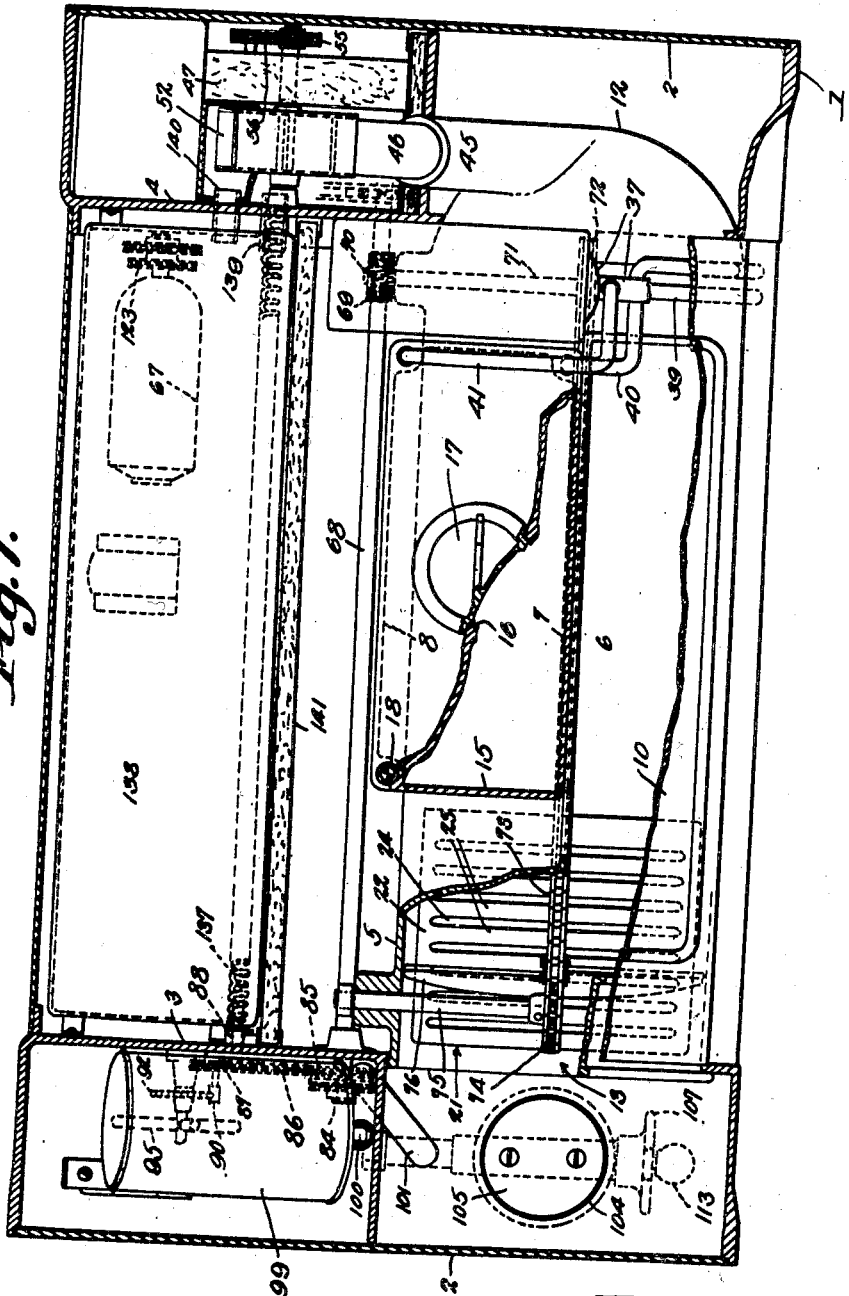
E. E. Zideck
INVENTOR.
BY
ATTORNEYS.

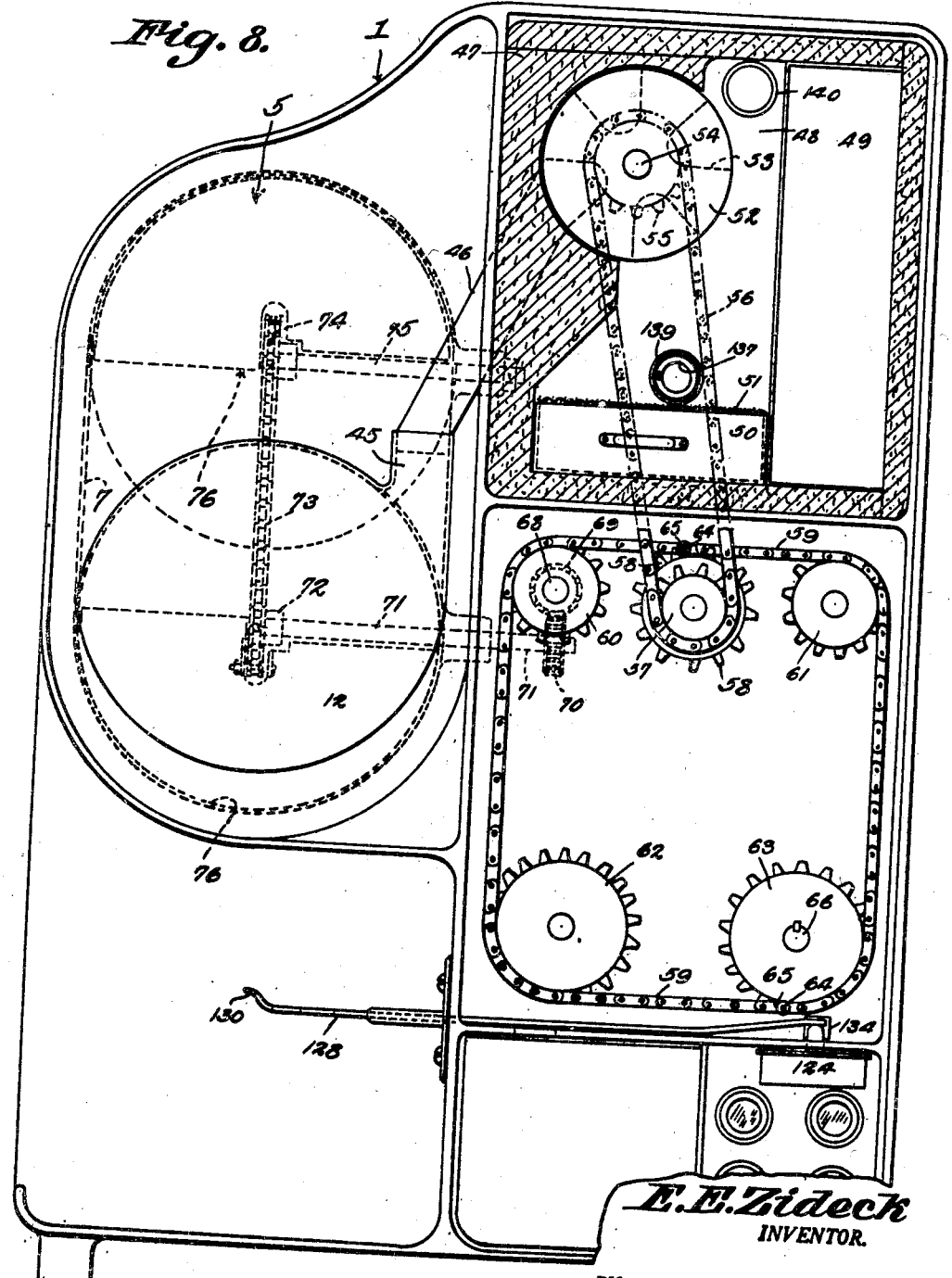

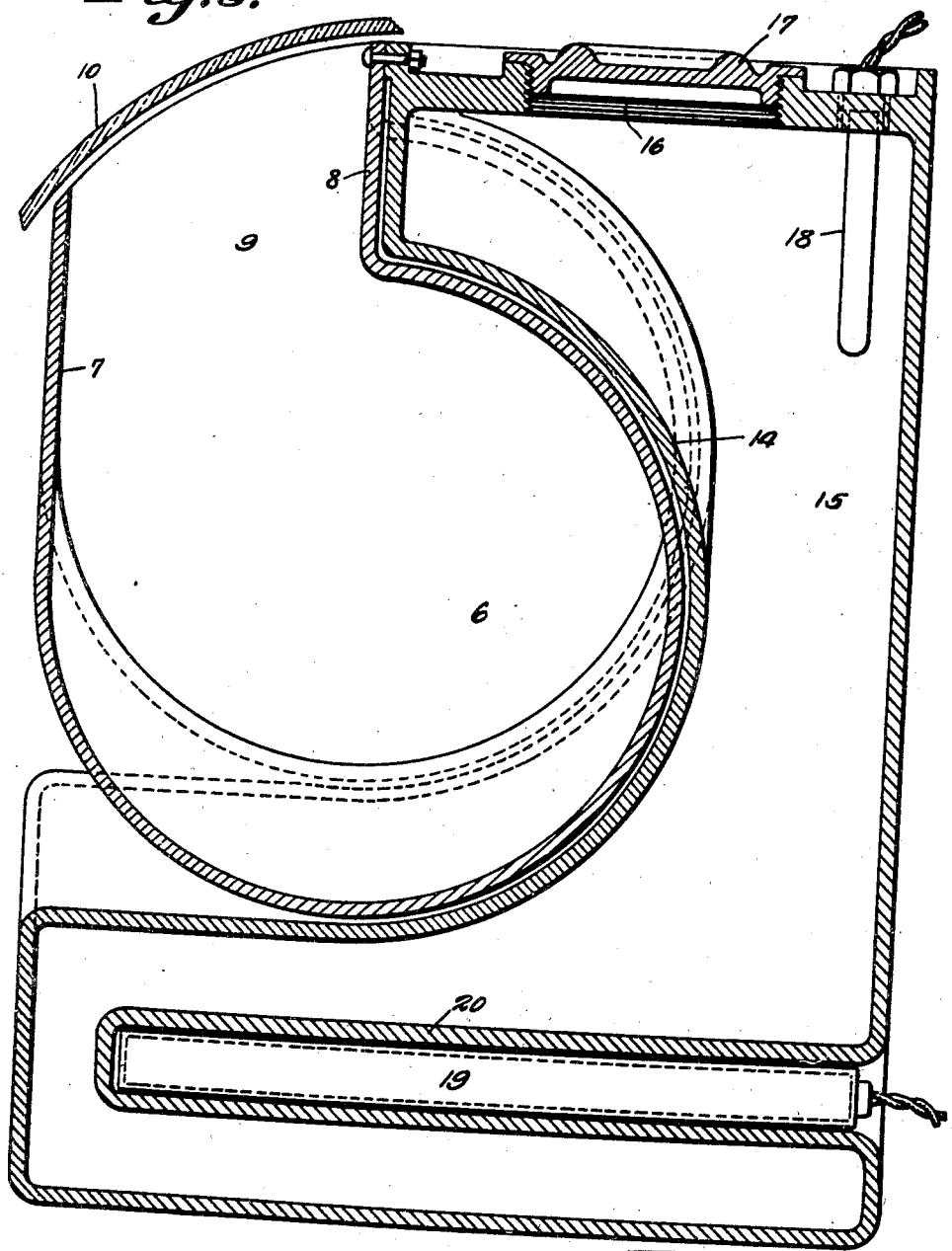

Feb. 3, 1948.     E. E. ZIDECK     2,435,378
CORN POPPING AND DISPENSING APPARATUS
Filed Oct. 31, 1944     10 Sheets-Sheet 8
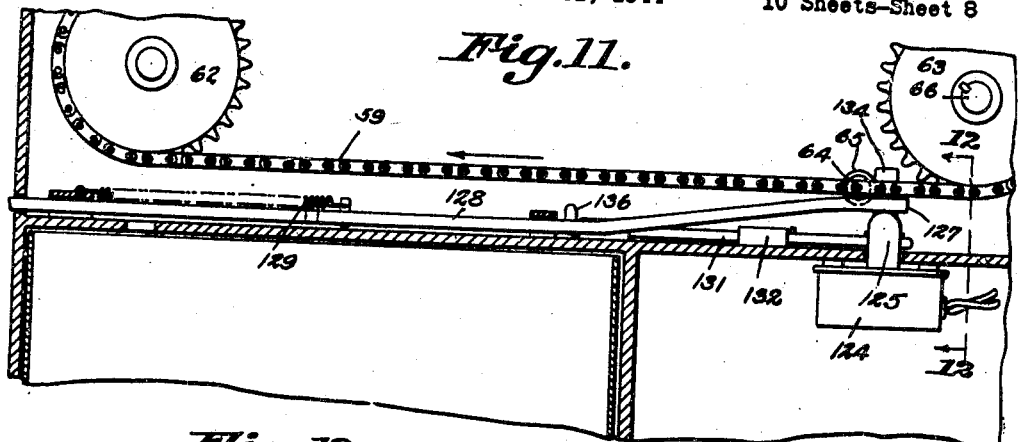
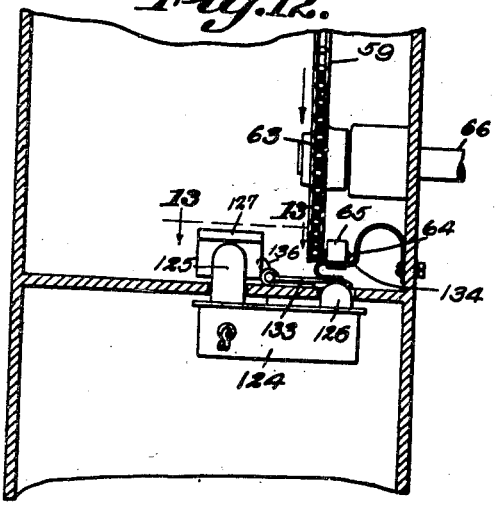
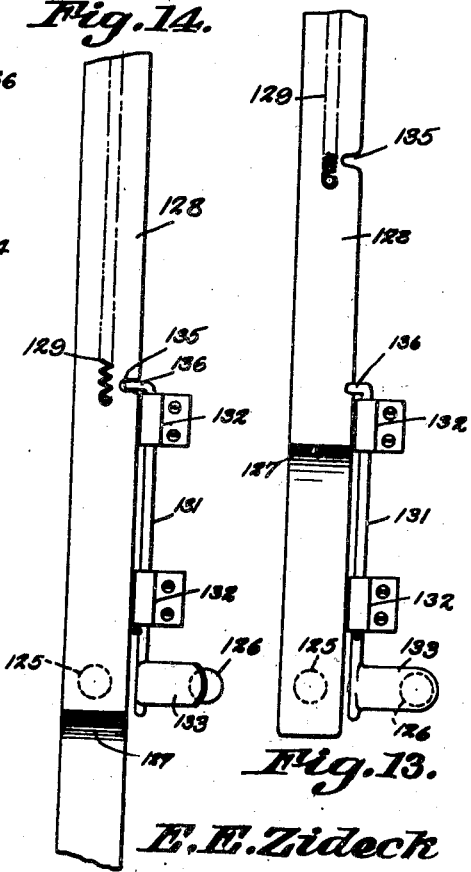
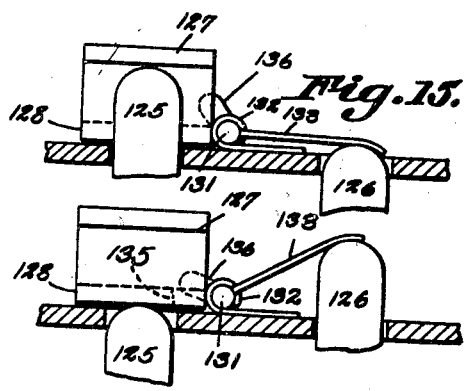
E. E. Zideck
INVENTOR.
BY
ATTORNEYS.

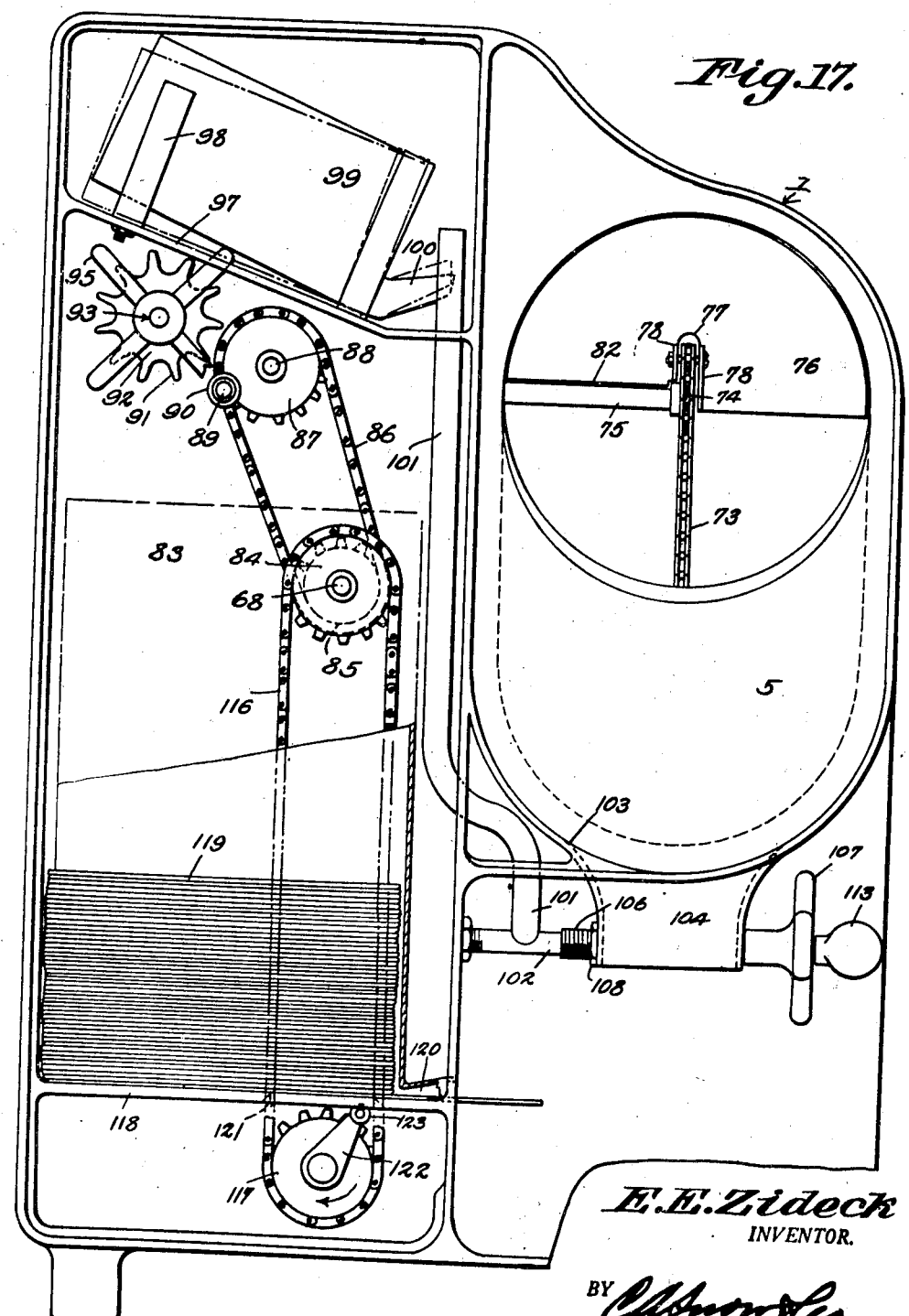

Feb. 3, 1948. E. E. ZIDECK 2,435,378
CORN POPPING AND DISPENSING APPARATUS
Filed Oct. 31, 1944 10 Sheets-Sheet 10
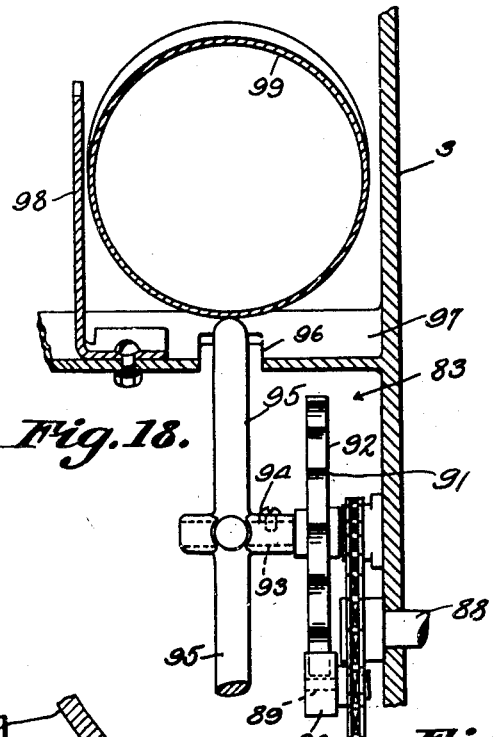
Fig.18.
Fig.20.
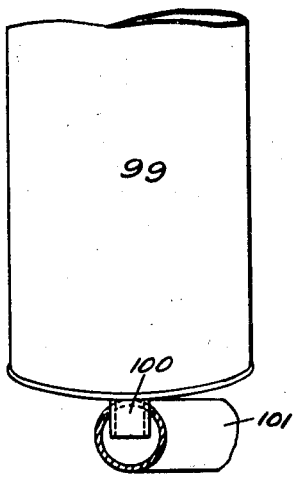
Fig.19.
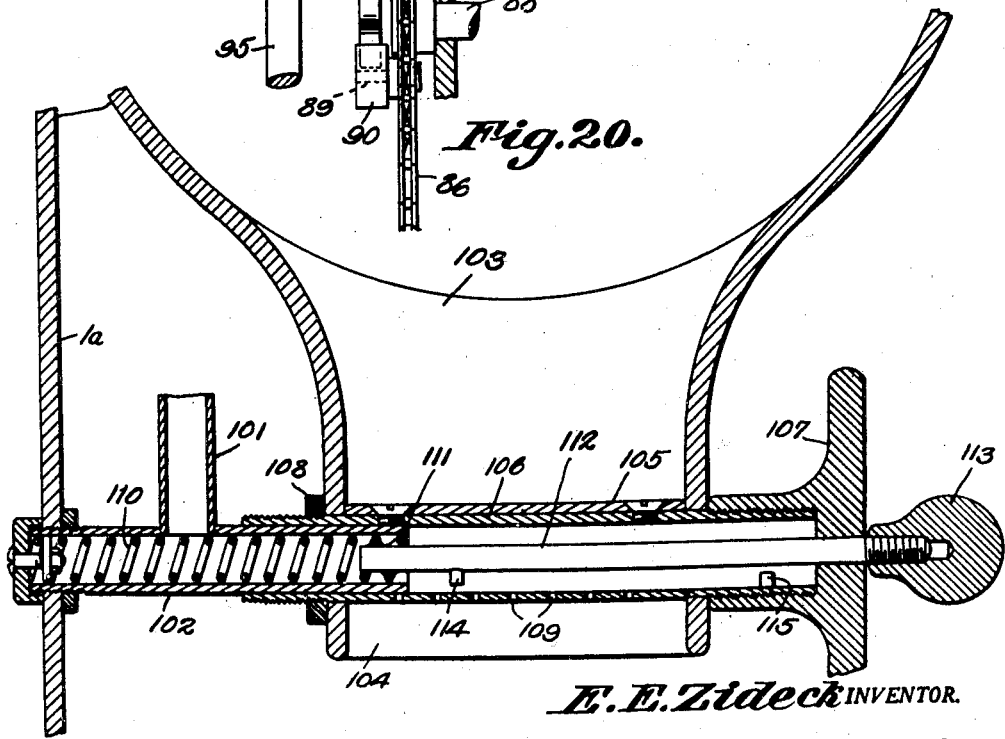
E. E. Zideck INVENTOR.
BY
ATTORNEYS.

Patented Feb. 3, 1948

2,435,378

UNITED STATES PATENT OFFICE 2,435,378

CORN POPPING AND DISPENSING APPARATUS

Ernest E. Zideck, Detroit, Mich., assignor of one-half to Joseph Hagler, Ortonville, Mich.

Application October 31, 1944, Serial No. 561,304

17 Claims. (Cl. 99—238.4)

This invention relates to vending machines and is designed primarily as a machine for feeding measured quantities of popcorn into a heated popping compartment, subjecting the popped corn to a spray of liquid fat, such as butter or the like, and delivering a measured portion of the popped corn to the customer with any desired amount of salt, the foregoing operations all being controlled by the insertion of a check or coin.

Another object of the invention is to provide an apparatus of this character the various units of which are readily accessible for the purpose of cleaning, repairing and/or adjusting the parts.

A still further object is to utilize means by which excess hot fats supplied to the corn, can be drained into a suitable trap or collector having means joined thereto whereby this fat can be reused.

A still further object is to utilize a combined chilling and measuring unit which is complete in itself and is insulated so as to maintain the corn about to be measured, at a low temperature preparatory to being delivered into the popping chamber or compartment.

Another object is to provide new and novel means for keeping the measuring and chilling unit supplied with corn from a main container, this corn-supplying mechanism being connected to and operated by the corn-delivering mechanism so that as a portion of the corn is delivered to the popping compartment, a newly measured portion will be supplied to the measuring unit.

A further object is to provide an apparatus in which the heating chamber and its heating element serve to maintain at a high temperature fats contained within a compartment embracing the popping chamber or compartment so that the fats are thus constantly in a fluid state and hot preparatory to being sprayed into the popping compartment and onto the contents thereof.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a top plan view of the complete apparatus.

Figure 2 is a front elevation thereof.

Figure 3 is an elevation of one side of the apparatus.

Figure 4 is an elevation of the opposite side of the apparatus.

Figure 7 is a view partly in top plan view and partly in horizontal section of the complete apparatus.

Figure 8 is an elevation of the corn chilling and measuring apparatus and adjacent parts.

Figure 9 is an enlarged vertical transverse section through the fats holder, the popping chamber therein, and the heating chamber.

Figure 11 is a side elevation of the switch mechanism.

Figure 12 is a section on line 12—12, Fig. 11.

Figure 13 is a plan view of a portion of said mechanism, said view being indicated by the line 13—13, in Fig. 12.

Figure 14 is a view similar to Fig. 13 but showing the operating mechanism shifted out of normal position and locked.

Figure 15 is a transverse section showing the switch mechanism in normal position.

Figure 16 is a view similar to Fig. 15, showing the switch mechanism in shifted or locked position.

Figure 17 is a view showing partly in elevation and partly in section, the salt and paper bag dispensing mechanism.

Figure 18 is a transverse section through the salt container and its holder and showing a portion of the container agitating mechanism.

Figure 19 is a top plan view of a portion of the salt container and its outlet spout.

Figure 20 is an enlarged vertical section through the salt-delivering mechanism.

Figure 5:
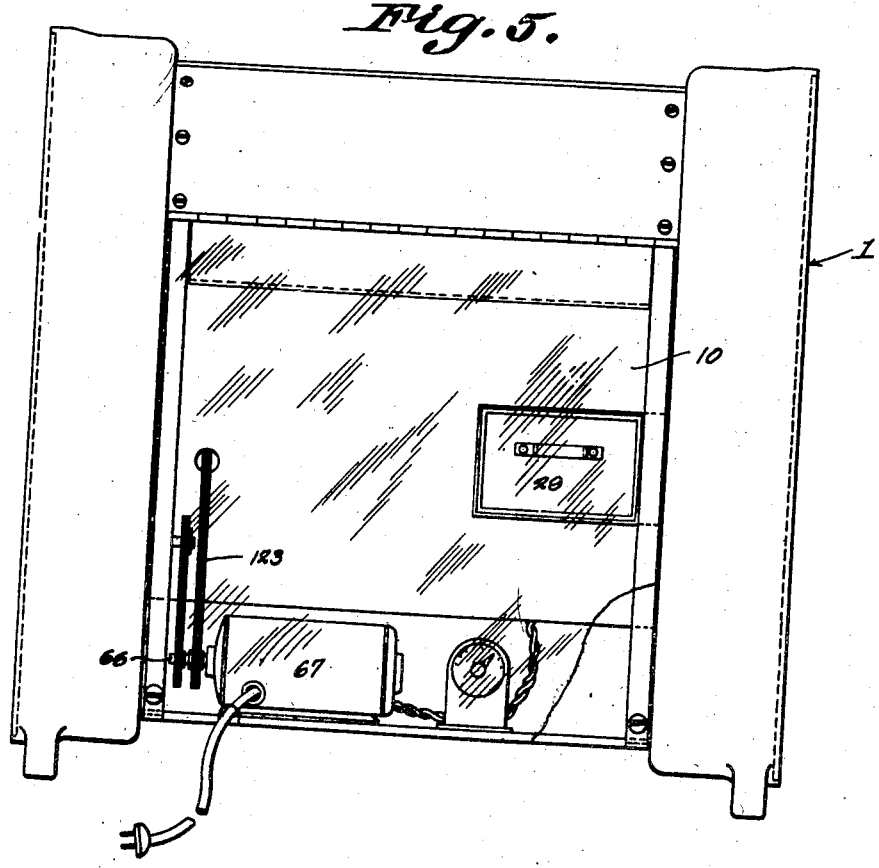
Figure 5 is a rear elevation.

Referring to the figures by characters of reference, 1 designates a casing of any suitable design and material and this casing may be provided wherever deemed necessary with movable doors and/or panels 2 some of which can be of transparent material whereby portions of the interior of the casing will be visible to persons standing adjacent thereto. Partitions 3 and 4 are provided in the casing adjacent to the respective sides thereof and serve to support an elongated container 5 providing a popping chamber 6. The front wall of the popping chamber can be vertically disposed as indicated at 7 while extended upwardly from the back of the popping chamber is an upper rear wall 8 cooperating with the wall 7 to provide an upwardly extending throat 9 positioned lengthwise of the popping chamber and closed at its top preferably by a transparent panel 10 through which the interior of the popping chamber can be viewed.

The wall 8 and wall 7 are joined by integral side walls 11 so that said walls cooperate to define a box-like extension.

The popping chamber has a rounded closed end 12 and an open end 13. The rounded end is seated in the partition 4 so as to be supported thereby while the open end of the popping chamber is seated in and supported by the partition 3. The popping chamber is inclined upwardly from the closed end 12 toward the open end 13 and the box-like extension formed on the popping chamber by the walls 7, 8 and 11, does not extend the full length of the popping chamber. Furthermore, as shown in Fig. 9, this box-like extension does not extend the full width of the popping chamber from front to back. Instead, the back portion of the popping chamber bulges backwardly so that it can be embraced by the concave front wall 14 of a fats holder 15. This fats holder is fitted against wall 8 and the back portion of the popping chamber 6 and is also extended forwardly beneath the popping chamber. It has a filling opening 16 in the top thereof provided with a suitable closure 17 and a thermostat 18 is preferably suspended within the fats holder from the top thereof for controlling an electric circuit leading to a heating unit 19 removably located in a pocket 20 formed within the lower portion of the fats holder.

Adjacent to the upper end of the bottom portion of the popping chamber there is a drain opening 21 in which is removably seated a strainer 22 which, as shown, can consist of a plate having transverse bars or slats 23 providing slots 24 between them.

A flange 25 is extended downwardly from the bottom of the container 5 and around the opening 21 and this flange serves to support a depending housing 26 detachably held thereto by bolts 27 or the like. The housing has its bottom inclined downwardly to an outlet 28 and removably supported within the housing is a screen drawer 29. The drawer is removable through the back as shown in Fig. 5. This drawer preferably is formed of perforated metal or of a screen and is designed to retain minute particles of corn while permitting hot fats to flow therethrough to the outlet 28.

A supplemental fats container 30 is supported within the casing 1 beneath the fats holder 15 and is so shaped as to drain toward a fitting 31 opening thereinto. This fitting is connected to the outlet 28 by a tube 32. Another tube 33 connects fitting 31 to a pocket 34 formed beneath the lowermost portion of the container 5 and communicating with the popping chamber 6 through an opening 35. Thus fats within the popping chamber 6 are free to drain through the opening 35 into pocket 34 and thence through the tube 33 to the supplemental receptacle 30 where they will mix with fats withdrawn through tube 32 from the container or housing 26. It is to be understood that the tube 32 can be formed with a gooseneck located in front of the lower rounded portion of the popping chamber 6 and indicated at 36. Thus the level of fats within the housing 26 can be maintained at any point desired.

A pump indicated generally at 37 is located above the lower portion of the popping chamber and the intake 38 of this pump is connected by a suction tube 39 with the outlet of the fitting 31 whereby, when the pump is in operation, fats may be withdrawn from the fitting 31 after they have drained thereto and to the receptacle 30 by way of the tubes 32 and 33. The pump operates to suck excess fats into the inlet 38 and expel them through a tube 40 into the top portion of the fats holder 15, and this pump also acts to withdraw hot fats from the holder 15 through a tube 41 and force them under pressure through a tube 42 to a pocket 43 located beneath the lowermost portion of the popping chamber 6. This pocket has one or more vents 44 opening therefrom into the popping chamber so that hot fats directed into the pocket under pressure by the pump, will be expelled forcibly into the chamber 6 and be sprayed over the contents thereof.

The popping chamber is provided in the upper portion of its closed end with a tubular inlet 45 which is extended upwardly to a spout 46 extending downwardly from the chilling and measuring unit of the apparatus. This unit is in the form of a block of insulating material indicated at 47, having a cavity 48 in the back portion of which is removably seated a container 49 for holding dry ice or other suitable refrigerant. In the bottom of the cavity and in front of the container 49 is a removable tray 50 the top of which is formed of a screen 51.

A measuring wheel 52 is mounted for rotation in the upper portion of the cavity and has regularly spaced measuring pockets 53 adapted, when the wheel is rotated, to be brought successively into register with the upper portion of the spout 46. A portion of the wheel is closely embraced by the block 47 while the remainder thereof projects into the cavity so that, if the cavity is filled with corn to be popped, said corn can flow into the pocket disposed in the cavity and be carried thereby to the spout.

Wheel 52 is mounted on a shaft 54 rotatable therewith and journaled in the partition 4. A sprocket 55 is secured to the shaft and is designed to receive motion through a chain 56 from a sprocket 57 secured to and rotatable with another sprocket 58 journaled within casing 1 beneath the block 47. Sprocket 58 is engaged by an endless chain 59 which is extended over spaced sprockets 60 and 61 and thence downwardly under spaced sprockets 62 and 63. This chain is provided with one or more laterally extended studs 64 each of which carries a roller 65.

Sprocket 63 is secured to the shaft 66 of an electric motor 67 the operation of which is controlled by the movement of chain 59 as hereinafter explained.

Sprocket 60 is secured to a shaft 68 which is journaled in the partitions 3 and 4 and is located back of the popping chamber 6. This shaft is provided near one end with a screw or worm 69 which is in constant mesh with a worm wheel 70 secured to a shaft 71. This latter shaft is extended transversely through the popping chamber 6 adjacent to the closed end thereof and carries a sprocket 72 on which is mounted an endless chain 73. Another sprocket 74 is mounted on a shaft 75 extending diametrically across the popping chamber 6 near its open end and this sprocket 74 also supports the endless chain 73.

Figure 10:
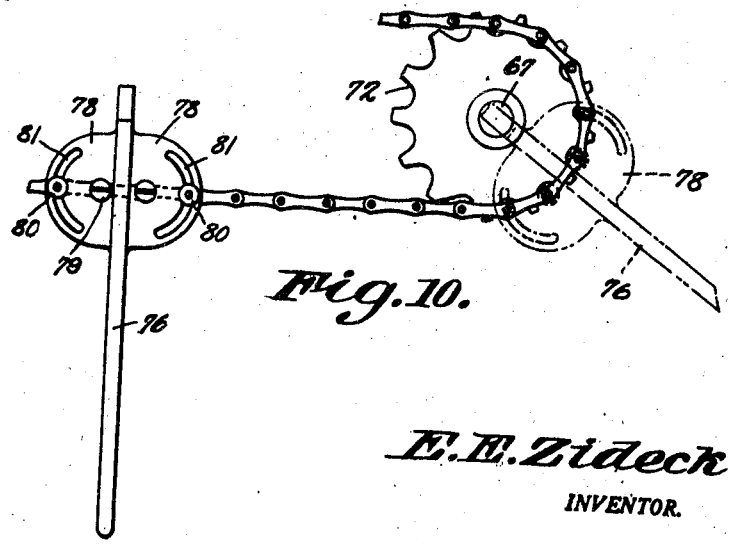
Figure 10 is an elevation of a portion of the popcorn conveying mechanism, one of the paddles being shown by full lines in one position and by broken lines in another position.
Figure 6:
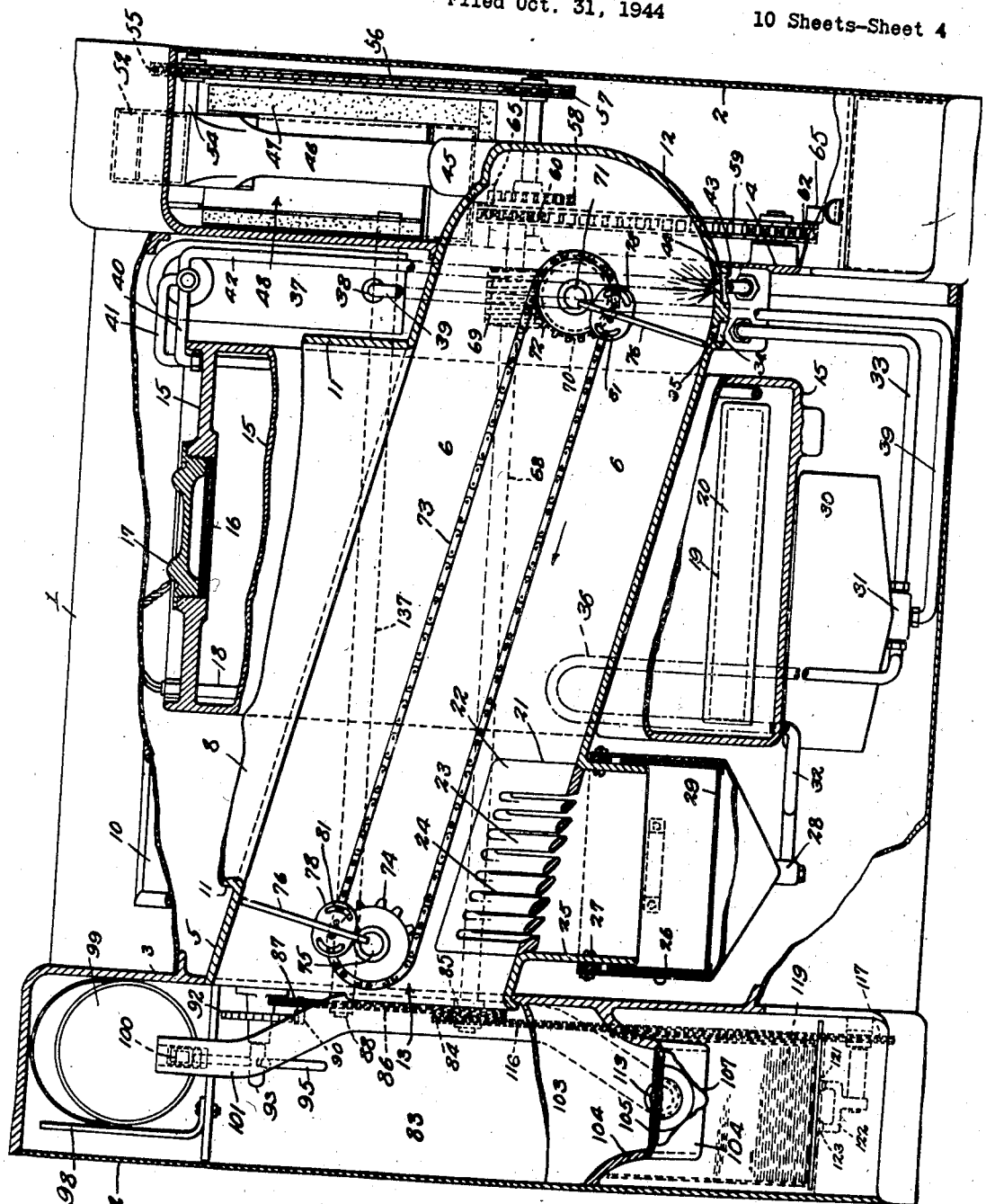
Figure 6 is a view partly in elevation and partly in vertical section, the section being taken longitudinally of the popping chamber of the apparatus and through adjacent parts.

One or more paddles 76 are connected to the chain 73 as shown in detail in Figs. 10 and 17. Each paddle is substantially semicircular and has a slot 77 extended into the straight side thereof at the center and proportioned to receive the chain and the sprocket as the paddle moves with the chain. Ears 78 are located at the sides of the slot and are extended in opposite directions therefrom. Each of these ears is attached to the pivot 79 and one end of a link of the chain and the pivots 80 of the next adjoining links of the chain are extended through arcuate slots 81 formed in the ears. All of these pivots serve to hold the ears assembled with the chain but by providing the slots 81 it is possible for the pivots 80 to move longitudinally of the slots when the paddles are moving about the sprockets 72 and 74. At that time each paddle will straddle the sprockets. It will be noted by referring to Fig. 17 that the paddle is cut away as at 82 so as to be able to clear the shafts on which the sprockets are mounted. Each paddle is so proportioned that when the endless chain 73 moves in the direction indicated by the arrow in Fig. 6, the paddle will scrape along the bottom of the popping chamber 6, thereby dragging popped corn along said bottom and over the grating or screen 22 so that it will be delivered from the open end of the popping chamber. If one paddle alone is used, the chain will operate to expel only that portion of the popcorn located in advance of the paddle while moving upwardly. If two paddles are used, as shown in the drawings, they will be brought to active position successively so that the operation of a second portion can commence immediately following the expulsion of the first portion of the popped corn, as will be obvious.

The shaft 68 extends back of the popping chamber and is journaled in partition 3. The end of this shaft projects into the compartment 83 provided between partition 3 and the adjacent side of the casing 1. This projecting portion of the shaft has two sprockets indicated at 84 and 85. The sprocket 85 transmits motion through a chain 86 to a sprocket 87 on a short shaft 88.

Chain 86 is provided with a laterally extended stud 89 on which is mounted a roller 90. This stud is adapted, once during each complete rotation of the chain 86 about its sprocket, to engage and actuate one tooth 91 of a wheel 92 rotatably mounted on a stub shaft 93. A plurality of these teeth are utilized, the teeth being regularly spaced so that every time the stud 89 completes one cycle of movement, it will engage a tooth and rotate the wheel 92 one step. Rotatable with the wheel 92 is a tappet comprising a hub 94 from which radiate fingers 95. As this tappet is rotated with a step-by-step motion due to intermittent engagement of the roller 90 with teeth 91, the fingers 95 are brought successively into position within an opening 96 in a support 97 extending from partition 3. A retaining strip or guard 98 is secured to the support and thus a space is provided between this guard and partition 3 in which a receptacle 99, holding salt, can be positioned loosely. The support is inclined downwardly and forwardly so that the receptacle 99 is likewise held in an inclined position. This receptacle has an outlet spout 100 at its lower end through which salt is adapted to flow and said spout opens into a downwardly extending chute 101 in the form of a tube the lower end of which discharges into a tubular receiver 102 fixedly secured to a portion of the frame 1ª of the casing and extending forwardly under a hopper 103 located where it will receive the popped corn when delivered from the upper open end of the popping chamber. See Fig. 6. A delivery spout 104 is integral with and extended downwardly from the bottom of the hopper and is located outside of the casing. This spout normally is closed by a tiltable valve 105 which is secured to and movable with a sleeve 106 rotatably mounted in opposed walls of the hopper and extending around one end of the tubular receiver 102. The sleeve 106 is held against longitudinal displacement by a knob 107 mounted on the forward end thereof and by a nut 108 mounted on the rear portion thereof. A series of apertures 109 are formed in the lower portion of the sleeve so as normally to discharge downwardly within the hopper 103.

A coiled spring 110 is secured at one end to the back end portion of the tubular receiver 102. This spring is positioned longitudinally of said receiver and its forward end is soldered or otherwise joined, as at 111 to the back end of a plunger 112. This plunger is slidably mounted in the sleeve 106 and in the knob 107 and projects forwardly beyond the knob where it has a knob or handle 113. A lug 114 is extended from the plunger and is so located that it can be brought into engagement with a retaining lug 115 located in the sleeve 106 as hereinafter explained.

The sprocket 85 heretofore referred to is engaged by a chain 116 which serves to transmit motion from shaft 68 to a sprocket 117 located in the lower portion of the casing below the level of a horizontal partition 118 on which a stack of paper sacks 119 is supported. An outlet opening or slot 120 is formed in front of the lowermost sack of the stack and a slot 121 is formed in partition 118 beneath the sacks so as to receive wiping fingers 122 which rotate with the sprocket 117. Each wiping finger has a soft material, such as rubber, on the free end thereof as shown at 123 for contact with the lowermost sack so that once during each rotation of the sprocket 117 in the direction indicated by the arrow in Fig. 17, this wiping material will engage the lowermost sack and push the sack forwardly from under the stack so that the forward end of the sack will be slid through opening or slot 120 into a position where it can be reached conveniently by the customer.

The electric motor 67 is adapted to drive the pump 37 by any suitable mechanism indicated generally at 123 in Fig. 5. The pump can be of any preferred type, either rotary or reciprocating, and its specific structure is of no consequence as it may be of any standard type. It is only necessary that the pump, when in motion, operate to draw hot fats through tube 41 from the fats holder 15, expel the fats under pressure into the pocket 43 so that they will be sprayed through the opening 44 onto the contents of the popping chamber, withdraw used fats from the containers 26 and 30 and the pocket 34, by suction, and return these used fats to the fats holder 15.

Operation of the motor 67 is controlled by a double switch 124 located in the motor circuit. This switch is normally open and, while it can be of any preferred construction, the form illustrated includes the use of spaced depressible buttons 125 and 126 coupled to act synchronously. The button 125 is positioned in the path of the upwardly inclined end 127 of a slidable strip 128 which is held normally retracted by a spring 129 and, in the structure illustrated, has a projecting end 130 positioned in front of the casing 1 where it can be gripped and actuated by a customer. It is to be understood that the operation of this strip can be controlled by suitable coin or check mechanism not illustrated.

A rock shaft 131 is located close to and at one side of the strip 128 and is mounted in bearings 132. At one end of this shaft there is a tongue 133 so positioned that when the shaft is rocked in one direction, the tongue will engage and depress the button 126, holding it against movement. This tongue is engaged by one end portion of a spring 134 so shaped and located as to be contacted by the roller 65 once during each cycle of rotation of the cycle of movement of the chain 59. A notch 135 is formed in the strip 128 so that when said strip is in normal position, as in Fig. 13, the notch is removed from under a finger 136 extended laterally from one end of the rock shaft 131. With the parts thus located, button 126 is held depressed because finger 136 is elevated and supported by strip 128 as in Fig. 15. Consequently the current to the motor is shut off. When the slide 128 is pushed inwardly against the action of spring 129, the forward inclined end 127 thereof comes against button 125 and depresses it. While this button is being depressed, the notch 135 arrives beneath the finger 136 so that the outward shifting of button 126 by the depressing of button 125 will cause tongue 133 to rock shaft 131 and move the finger 136 into the notch 135. Thus strip 128 is locked against return movement and at the same time current is directed to the motor and the parts of the apparatus are set in motion. After the chain 59 has travelled a distance sufficient to bring roller 65 into contact with spring 134, said spring is depressed, forcing the tongue 133 against the button 126 so as to depress the button and cut off the current and at the same time lift the finger 136 out of notch 135 and release the strip 128 for return to its initial position.

The shaft 88 of sprocket 87 is a short one journaled in partition 3 and secured to one end of a coiled wire 137 of stiff material which is extended across the bottom portion of a container 138 located in the back portion of the top of the casing 1 and holding bulk corn to be popped. That end of the coiled wire remote from the shaft 88 extends into a feed tube 139 projecting through the partition 4 and opening into the cavity 48 in block 47. This feed tube discharges into the cavity adjacent to the bottom thereof as shown in Fig. 8. Another tube 140, constituting an overflow, connects the upper portion of the cavity 48 to the upper portion of the bulk container 138. It is preferred to locate the container 138 back of a partition 141 of insulating material, shown in Fig. 7, so that heat radiating from the fats holder and the popping chamber will not be transmitted to the bulk material in the container 138.

Those parts of the apparatus requiring insulation can be so provided, as will be obvious and wherever it is desired to expose any of the contents of the casing to the view of customers, portions of the casing walls can be made transparent or suitable doors or windows can be provided.

Hopper 103 is normally closed by the valve 105. The fats to be used are placed in the fats holder 15 and the container 138 is filled with corn to be popped. Salt is placed in the container 99 and current to the motor is cut off. The heating element is constantly in circuit so as to be energized and maintain the fats in a molten state.

When the machine is to be actuated, the projecting end of slide 128 is thrust inwardly. This actuation of the slide, as before stated, can be controlled by suitable check-control mechanism. When the slide is pushed inwardly it operates to throw and lock the switch as heretofore explained so that the motor is set in motion. This results in the performance of several operations, and these operations will continue until the chain 59 has moved a predetermined distance to bring the roller 65 into contact with spring 134 and effect actuation of the switch to cut off the current to the motor. While the chain 59 is in motion it drives the sprockets 60 and 57. Sprocket 57 transmits motion through chain 56 to the measuring wheel 52 which picks up a measure of corn which has been held in a chilled condition within cavity 48 and conveys it to the chute 46 from which it gravitates through inlet 45 into the pocket formed by the lower end portion 12 of the popping chamber 6. While this operation is taking place, the sprocket 60, through shaft 68 and the worm gearing 69—70, is actuating the conveyer chain 73 so as to cause the paddle or paddles thereof to move slowly up the inclined bottom of the popping chamber. This popping chamber has been maintained at a high temperature by the heating unit and the hot fats partly surrounding the popping chamber so that when the green or unpopped corn is delivered into the chamber 6, it will be contacted by the jets of hot fats issuing from the vents 44. These jets thus serve to agitate and pop the corn and, in cooperation with the high temperature of the popping chamber will cause all of the corn to pop before it is expelled from the chamber 6. After a predetermined time interval the measure of popped corn is delivered from the upper end of the popping chamber and dropped into hopper 103 where it is retained by the closed valve 105.

During the movement of the paddle or paddles and the actuation of the measuring wheel, the tappet fingers 95 come against the bottom of the container 97 and lift it from its normal position after which it is dropped onto its support. This action results in loosening the salt contained in the container so that a portion thereof will gravitate through the spout 100 into the chute 101 and be delivered into the receiver 102. Also during the foregoing operation, the wiping finger 122 is caused to make one complete rotation in the direction of the arrow in Fig. 17 and this will cause the contact portion 123 thereof to engage the bottom of the lowermost paper sack 119 and thrust said sack forwardly where it can easily be reached, as shown in Fig. 17. By now the switch has been actuated as before explained to cut off the current to the motor with the result that all of the mechanism stops. The customer withdraws the partly ejected sack, opens it, and places it under the delivery spout 104. By turning knob 107, the valve 105 is turned so as to release the popcorn supported thereby and this corn will drop into the bag. Thereafter or prior thereto, the plunger 112 can be pulled forwardly so as to elongate the spring 110. This elongation causes each convolution of the spring to act as a conveyer of salt so that salt contained in the receiver 102 will be pulled forwardly into the sleeve 106 and as it is agitated by the spring moving into the sleeve, the salt will be delivered through the openings 109 onto the corn contained in the filled sack. If desired the plunger can be pulled back and given a partial rotation so as to cause the lug 114 to move into position back of the lug 115 and thus be held open so as to afford ample opportunity for the salt to escape. When this is done it is preferred to pull the plunger 112 outwardly and fasten it before the valve is opened. Thus when the parts are given a partial rotation to release the popped corn, the salt will rain down on the popped corn as it falls into the bag.

When the popcorn is in the popping chamber the hot fats from container 15 are pumped continuously while the motor is operating so as to enter the lowest part of the chamber at 34 where they form a geyser-like jet or spray which envelops the green corn in the lowest end portion of the chamber. This corn is moved about by the force of the jets of hot fats and the continuous contact of the kernels with the hottest fats coming in at 34 will cause one kernel after another to pop. One kernel will pop immediately, other kernels will pop after prolonged contact with the hottest fats coming in, and the rest of the kernels will pop just before the paddle comes along and moves the popcorn toward the open end of the popping chamber. It is well known that kernels of corn will not all pop at the same time and that is why the hottest fats are brought in continuously, contacting and moving the kernels while the cooling fats are draining back into the receptacle 30 and returned for reheating. Surplus fats carried upwardly by the popcorn will drain between the slats of the screen or grid 22 into the drawer 29 constituting a strainer and as the bottom of this drawer is formed of screen material, any particles of corn that may have been expelled through the slots 24, will be trapped in the drawer while the fats will drain past the screen and into the outlet portion of the casing or receiver 26. As before stated the fats in the pocket 34 which are drained thereto from the outlet 35 will drain to the receptacle 31 so that when the pump is set in motion and a suction established, hot fats will be withdrawn not only from the outlet 28 but also from pocket 34 and receptacle 30 and thus returned to the hot fats holder 15 for reuse.

The apparatus described, when fully charged, contains an ample supply of unpopped corn for filling a great number of bags and sufficient fat is also held within the holder 15 to properly treat the corn when popped. It is desirable to chill the corn before it is delivered into the popping chamber because the popping operation is thus greatly expedited and it is for that reason that a dry ice container is located in the cavity from which the measuring wheel removes the corn.

When the shaft 88 is rotated by the chain 86 and sprocket 87, the coiled wire 137 which is completely embedded in the bulk material in the corn container, will act as a resilient screw conveyer and will feed the unpopped corn to and through the tube 139 until the cavity 48 is filled completely. Thereafter if additional corn is supplied to the cavity, it will return to the bulk container by way of the upper tube 140.

Any particles of corn which may sift from the material in the cavity 48 will drop through the screen 51 into the drawer or tray 50 which obviously can be removed whenever desired for the purpose of cleaning. The container for holding dry ice is also removable, a suitable door or doors being provided for this purpose wherever necessary.

It will be noted that this apparatus maintains on hand at all times a quantity of hot fats and corn ready to be popped so that when the mechanism is set in motion by a customer, the operation of popping the corn and delivering it together with a bag and seasoning salt, can all be effected properly and it becomes unnecessary to store within the apparatus a large quantity of popped corn likely to become stale or rancid.

While the present apparatus is designed primarily for popping and dispensing corn it is to be understood that it can be employed effectively for heating, seasoning and dispensing other materials.

What is claimed is:

1. Popcorn dispensing apparatus including a popping chamber, a heating unit, a hot fats holder positioned for transmitting heat from the heating unit to the popping chamber, a conveyer in the popping chamber, and means operating in timed relation with the conveyer for delivering unpopped corn into said chamber.

2. Popcorn dispensing apparatus including a popping chamber, a heating unit, a hot fats holder positioned for transmitting heat from the heating unit to the popping chamber, and means for directing hot fats from the holder under pressure into the popping chamber.

3. Popcorn dispensing apparatus including a popping chamber, a heating unit, a hot fats holder positioned for transmitting heat from the heating unit to the popping chamber, means for directing hot fats from the holder under pressure into the popping chamber, and means for returning surplus hot fats to the holder.

4. Popcorn dispensing apparatus including a popping chamber, a heating unit, a hot fats holder positioned for transmitting heat from the heating unit to the popping chamber, a conveyer in the popping chamber, means operating in timed relation with the conveyer for delivering unpopped corn into said chamber, and means for delivering hot fats from the holder into the chamber.

5. Popcorn dispensing apparatus, including a popping chamber, a heating unit, a hot fats holder positioned for transmitting heat from the heating unit to the popping chamber, a conveyer in the popping chamber, means operating in timed relation with the conveyer for delivering unpopped corn into said chamber, means for spraying hot fats under pressure into the popping chamber, and means for returning excess fat from the popping chamber to the holder.

6. Popcorn dispensing apparatus including a popping chamber, a heating unit, a measuring element, means for directing unpopped corn from the measuring element to the popping chamber, means for chilling the unpopped corn, a hot fats holder positioned for transmitting heat from the heating element to the popping chamber, and means for delivering hot fats under pressure to the popping chamber.

7. Popcorn dispensing apparatus including a popping chamber closed at its lower end to provide a pocket and inclined from said pocket to its upper end, said chamber having an outlet for popped corn at its upper end and a drain opening for fats adjacent to but below said outlet, an endless conveyor within the popping chamber, means for delivering measured quantities of unpopped corn into the lower portion of the popping chamber, means for actuating the conveyer to deliver corn from the open end of the popping chamber, means for directing a jet of hot fats upwardly against the contents of said pocket to agitate and pop the same, and means for heating the popping chamber.

8. Popcorn dispensing apparatus including an inclined popping chamber closed at its lower end and open at its upper end, an endless conveyer within the popping chamber, means for delivering measured quantities of unpopped corn into the lower portion of the popping chamber, means for actuating the conveyer to deliver corn from the open end of the popping chamber, a hot fats holder embracing the popping chamber, and means for heating the hot fats holder to maintain the contents thereof in a liquid condition and transmit heat through the contents to the popping chamber.

9. Popcorn dispensing apparatus including an inclined popping chamber closed at its lower end and open at its upper end, an endless conveyer within the popping chamber, means for delivering measured quantities of unpopped corn into the lower portion of the popping chamber, means for actuating the conveyer to deliver corn from the open end of the popping chamber, a hot fats holder embracing the popping chamber, means for heating the hot fats holder to maintain the contents thereof in a liquid condition and transmit heat through the contents to the popping chamber, and means for withdrawing hot fats from the holder and delivering them under pressure into the popping chamber.

10. A popcorn dispensing apparatus including an inclined popping chamber closed at its lower end and open at its upper end, said chamber having an inlet adjacent to its lower end and outlets adjacent to both ends, means for directing unpopped corn into the popping chamber, a fat holder embracing the popping chamber, means for heating the contents of the fat holder, said holder and its contents constituting means for transmitting heat from the heating means to the popping chamber, means for withdrawing hot fats from the holder and delivering them under pressure through the inlet onto the contents of the popping chamber, and means for gathering excess fats delivered through the outlets from the popping chamber, said fat forcing means including a means for returning the gathered fats to the hot fats holder.

11. A popcorn dispensing apparatus including an inclined popping chamber closed at its lower end and open at its upper end, a hopper positioned to receive popped corn from the upper end of the popping chamber, a salt dispenser, means carried by the salt dispenser for normally closing the hopper, a bag dispenser, a salt container, means for conveying popped corn within the popping chamber to the open end thereof and delivering it into the hopper, and means operating in timed relation with the corn conveying means for delivering salt to the dispenser and delivering a bag, said salt dispenser being shiftable to open the hopper closure and deliver hot corn from the hopper.

12. Popcorn dispensing apparatus including an inclined popping chamber having an open upper end, a hopper for receiving material from said end, a heating element, a hot fats holder constituting means for transmitting heat from the heating element to the popping chamber, means for directing measured quantities of unpopped corn into the popping chamber, means for directing hot fats from the holder under pressure into the popping chamber, means for conveying popped corn to the open end of the popping chamber for delivery into the hopper, and a valve normally closing the hopper.

13. Popcorn dispensing apparatus including an inclined popping chamber having an open upper end, a hopper for receiving material from said end, a heating element, a hot fats holder constituting means for transmitting heat from the heating element to the popping chamber, means for directing measured quantities of unpopped corn into the popping chamber, means for directing hot fats from the holder under pressure into the popping chamber, means for conveying popped corn to the open end of the popping chamber for delivery into the hopper, and a valve normally closing the hopper, said valve including a rotatable salt dispenser, and means operating in timed relation with the conveyer for directing salt into the dispenser.

14. Popcorn dispensing apparatus including a popping chamber having an inlet, means for heating the popping chamber, a container for holding unpopped corn, a structure having a cavity provided with a corn inlet and a corn outlet in communication with said container, means for removing measured quantities of corn from the cavity and delivering it to the popping chamber, a coiled element rotatably mounted in the container and extending into the corn inlet of the cavity, and means for simultaneously actuating the measuring means and the said coiled element to remove unpopped corn from the cavity to the container and to deliver unpopped corn to the cavity, respectively.

15. Popcorn dispensing apparatus including a popping chamber having an inlet, means for heating the popping chamber, a container for holding unpopped corn, a structure having a cavity provided with a corn inlet and a corn outlet in communication with said container, means for removing measured quantities of corn from the cavity and delivering it to the popping chamber, a coiled element rotatably mounted in the container and extending into the corn inlet of the cavity, means for simultaneously actuating the measuring means and the said coiled element to remove unpopped corn from the cavity to the container and to deliver unpopped corn to the cavity, respectively, and a chilling element contained within the cavity.

16. Popcorn dispensing apparatus including a popping chamber having an inlet, said chamber being open at one end, means for heating the popping chamber, means in the popping chamber for conveying popped corn to the open end thereof, a rotatable corn measuring element, a rotatable coil, a container housing the coil and constituting means for holding a supply of unpopped corn, a motor, and separate means actuated by the motor for rotating the coil to feed unpopped corn to the measuring element, for driving the measuring element, and for actuating the conveyer in the popping chamber.

17. Popcorn dispensing apparatus including a popping chamber having an inlet, said chamber being open at one end, means for heating the popping chamber, means in the popping chamber for conveying popped corn to the open end thereof, a rotatable corn measuring element, a rotatable coil, a container housing the coil and constituting means for holding a supply of unpopped corn, separate means for rotating the coil to feed unpopped corn to the measuring element, for driving the measuring element, and for actuating the conveyer in the popping chamber, said means including an electric motor, a switch-controlled circuit leading to the motor, means for locking the switch of said circuit in closed position, and means actuated by the motor for unlocking and opening the switch.

ERNEST E. ZIDECK.

REFERENCES CITED

The following references are of record in the file of this patent:

UNITED STATES PATENTS

| Number | Name | Date |
|---|---|---|
| Re. 13,859 | Bullis | Jan. 5, 1915 |
| 1,192,634 | Holcomb | July 25, 1916 |
| 1,426,756 | Mininberg | Aug. 22, 1922 |
| 1,497,025 | Priest | June 10, 1924 |
| 1,634,259 | Hutchinson | July 5, 1927 |
| 2,108,627 | Tyler | Feb. 15, 1938 |
| 2,123,663 | Roach | July 12, 1938 |
| 2,216,805 | Case | Oct. 8, 1940 |